United States Patent
Satish et al.

(10) Patent No.: US 8,108,923 B1
(45) Date of Patent: Jan. 31, 2012

(54) ASSESSING RISK BASED ON OFFLINE ACTIVITY HISTORY

(75) Inventors: Sourabh Satish, Fremont, CA (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 1412 days.

(21) Appl. No.: 11/324,190

(22) Filed: Dec. 29, 2005

(51) Int. Cl.
*G06F 9/00* (2006.01)

(52) U.S. Cl. ........... 726/11; 726/2; 726/3; 726/4; 726/5; 726/16; 726/17; 726/21; 726/22; 726/25; 726/26; 726/27; 713/166; 713/168

(58) Field of Classification Search .................. 726/2–5, 726/16–17, 21–22, 25–27; 713/166, 168
See application file for complete search history.

(56) References Cited

U.S. PATENT DOCUMENTS

| | | | |
|---|---|---|---|
| 7,788,366 B2 * | 8/2010 | Yacoby et al. ............ 709/224 |
| 2003/0131245 A1 * | 7/2003 | Linderman ............... 713/176 |
| 2004/0143753 A1 * | 7/2004 | Hernacki et al. ........... 713/200 |
| 2005/0216957 A1 * | 9/2005 | Banzhof et al. ............ 726/25 |
| 2006/0026688 A1 * | 2/2006 | Shah ......................... 726/25 |
| 2006/0156380 A1 * | 7/2006 | Gladstone et al. .......... 726/1 |
| 2006/0250968 A1 * | 11/2006 | Hudis et al. ............... 370/241 |
| 2007/0094711 A1 * | 4/2007 | Corley et al. .............. 726/3 |
| 2007/0101432 A1 * | 5/2007 | Carpenter ................. 726/25 |
| 2007/0124803 A1 * | 5/2007 | Taraz ........................ 726/4 |
| 2008/0172382 A1 * | 7/2008 | Prettejohn ................. 707/6 |

OTHER PUBLICATIONS

NetIQ, "NetIQ Security Manager: Delivers comprehensive, centralized security manageemnt in real time", http://www.evolve-online.com/pages/resources/datasheets/netiq/securitymanager.pdf, 2004.*
Dyer et al., "Personal Firewalls and Intrusion Detection Systems", http://www.paramecium.org/~lender/publications/iwar2001.pdf, 2001.*

* cited by examiner

*Primary Examiner* — Vivek Srivastava
*Assistant Examiner* — Hee Song
(74) *Attorney, Agent, or Firm* — Wilmer Cutler Pickering Hale and Dorr LLP

(57) ABSTRACT

Controlling access to a protected network is disclosed. In some embodiments, one or more events that occur will a host is disconnected from the protected network are logged. The log is provided to one or more devices associated with the protected network when the host requests access to the protected network after a period in which it was not connected. In some embodiments, a network access control or other device or process uses the log to determine whether and/or an extent to which the host should be permitted to connect to the network.

37 Claims, 10 Drawing Sheets

01. disconnect from CorpNet
02. power off    
03. connect to ssid Airport
04. access email (IMAP)
05. disconnect from Airport
06. power off
07. connect to ssid FirstHotel
08. access email (IMAPS)
    - downloaded attachment: customerdemo.exe
09. disconnect from FirstHotel
10. power off
11. connect to ssid CoffeeHaus
12. browse web
    - 64 total sites visited
    - 23 new sites visited
    - 1 file downloaded
    - 2 Active X controls installed
    - Java applets executed
13. installed FreeBieWare.exe
14. disconnect from CoffeeHaus
15. added user "guest"
16. installed customerdemo.exe
    - registry modified
    - new files added to C:\Windows
17. connect to ssid CustomerSite
18. access email (POP)
19. gave administrator privileges to user "guest"
20. ran regedit.exe
21. remove antivirus.exe
...
52. attempt connect to CorpNet
53. activity list sent to nac.corp.com

Fig. 4

ASSESSING RISK BASED ON OFFLINE ACTIVITY HISTORY

BACKGROUND OF THE INVENTION

Network admission control servers typically attempt to determine whether a client should be allowed to join a network based on whether the client is up-to-date with patches and security definitions. For example, when an employee takes a laptop on a business trip, the network admission control server will determine whether the laptop should be re-admitted to the enterprise network upon the employee's return. If the client is not up-to-date, the admission control server may require the client to join a remediation network where the appropriate patches and definitions can be applied. Once the client is up-to-date, the client is admitted to the network.

There are many scenarios in which the criteria used for admission decisions are insufficient to make a good judgment about the risk of allowing admission. Enterprises are often behind in their patch and update deployment. Even diligent enterprises may be out-of-date due to time spent testing updates before mandating they be applied to the entire network. There are also many forms of malicious software/code, sometimes referred to as "malware," that exploit unknown vulnerabilities, system misconfigurations, third party software, and so on, which can be present irrespective of the patch level of the client. Additionally, actions taken by a user while detached from the enterprise network, such as downloading and installing software, modifying the registry, and so on, may go undetected and are not considered by a typical network admission control server. In each of these cases, a client may be admitted to the enterprise network by a typical network admission control server, despite the significant risk that the client poses.

Therefore, it would be desirable to have a better way to make network admission decisions and to determine what post-admission controls should be applied.

BRIEF DESCRIPTION OF THE DRAWINGS

Various embodiments of the invention are disclosed in the following detailed description and the accompanying drawings.

FIG. 4 illustrates an example of an activity log.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
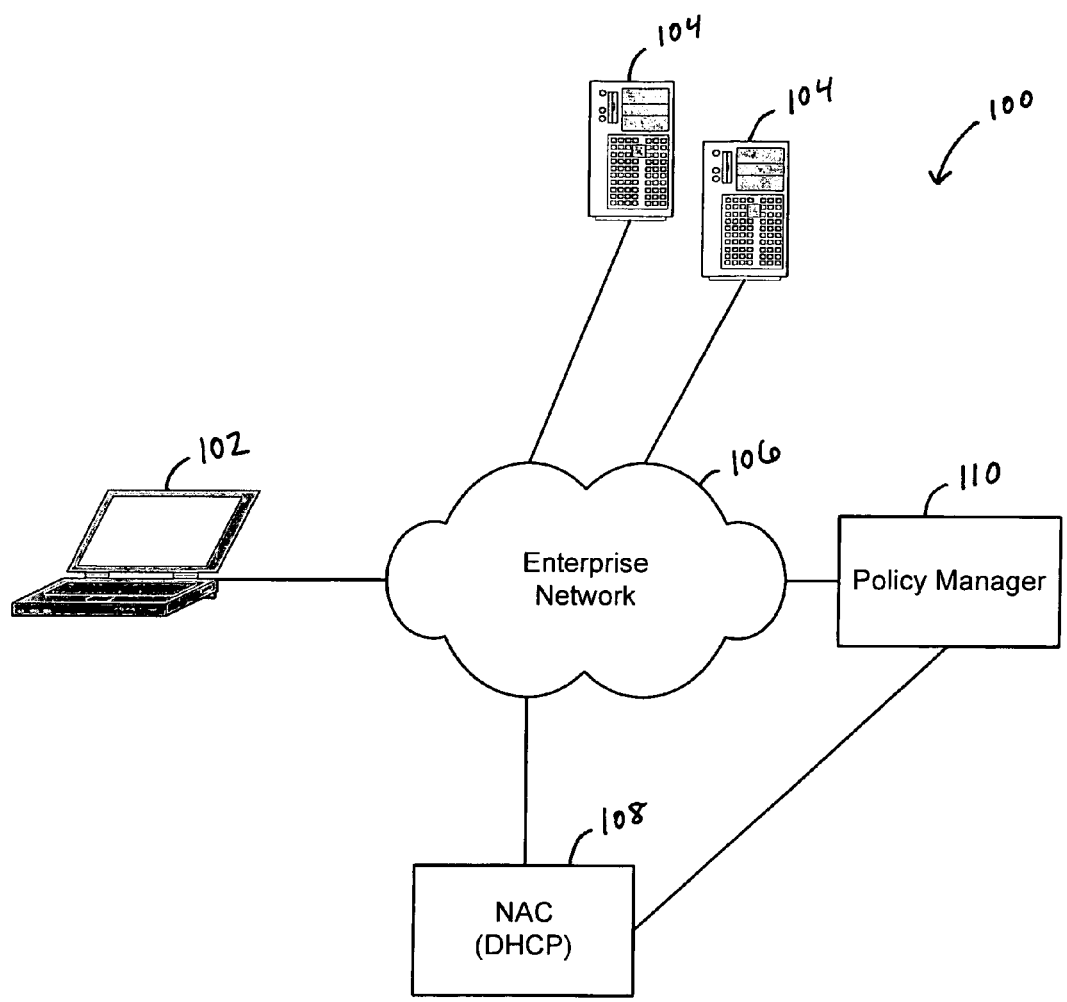
FIG. 1 is a diagram illustrating an embodiment of a system having network admission control.

FIG. 1 is a diagram illustrating an embodiment of a system having network admission control. System 100 includes at least one client 102, and other nodes, such as servers 104, that are connected to a network, such as enterprise network 106. In this example, client 102 is an employee laptop. Client 102 may also be one of a variety of other devices, such as a tablet, a PDA, or other computing platform, as applicable.

Typically, a system such as system 100 includes a variety of security protections not shown in FIG. 1. For example, firewalls, intrusion detection and intrusion prevention systems, and other monitors are in place to verify that client 102 and the traffic it sends and receives do not pose a security risk.

Client 102 may be connected and disconnected from enterprise network 106 on a routine basis. For example, an employee may periodically take a laptop home at night to read e-mail, or may take it on business trips or to customer sites. As described in more detail below, when the employee attempts to reconnect client 102 to enterprise network 106, for example, upon return to the office the following morning, network admission control server (hereinafter "NAC") 108 consults policy manager 110 determine whether client 102 may access all or part of enterprise network 106, and whether any remediation is required.

In this example, NAC 108 also provides DHCP services. In other cases, DHCP services may be provided by a separate DHCP server, or another device, as appropriate. Similarly, in some cases, the functionality of NAC 108 and policy manager 110 may be combined in a single device, and may perform additional tasks such as intrusion detection and prevention and checking MAC addresses. In the example shown NAC 108 has a direct connection to policy manager 110, but in other embodiments NAC 108 and policy manager 110 do not have a direct connection and instead communicate via enterprise network 106.

As described in more detail below, policy manager 110 typically holds configurable security policies for a variety of devices and circumstances, such as a mandatory minimum patch level, maximum length of time between virus scans, password characteristics, and so on.

Figure 2:
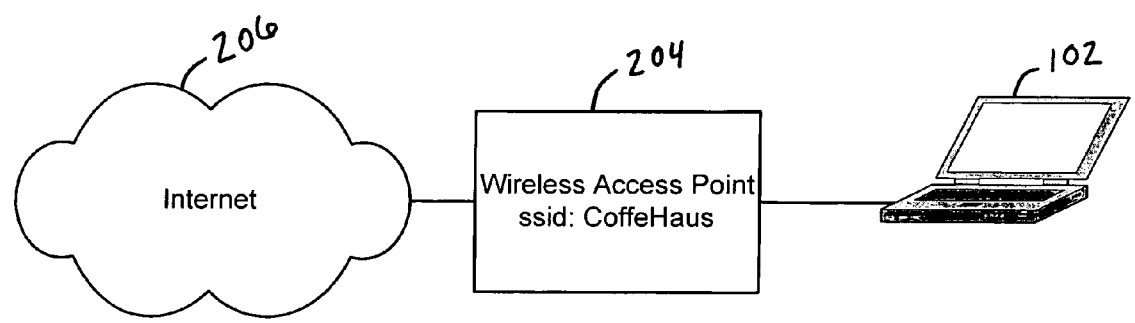
FIG. 2 is a diagram illustrating an embodiment of a client roaming outside an enterprise network.

FIG. 2 is a diagram illustrating an embodiment of a client roaming outside an enterprise network. In this example, an employee has disconnected client 102 from enterprise network 106 and physically taken it to a coffee shop offering free wireless Internet access to patrons. Client 102 has associated with access point 204, which has an ssid of "CoffeeHaus," and uses the connection to access assorted Internet websites (206). While it is outside enterprise network 106, client 102 may be exposed to significant security risks. For example, without the benefit of enterprise security, client 102 may be subject to worm attacks that would otherwise be prevented. Similarly, websites known to contain malware, and therefore typically blocked by the enterprise firewall, may be readily reachable from CoffeeHaus.

Figure 3:
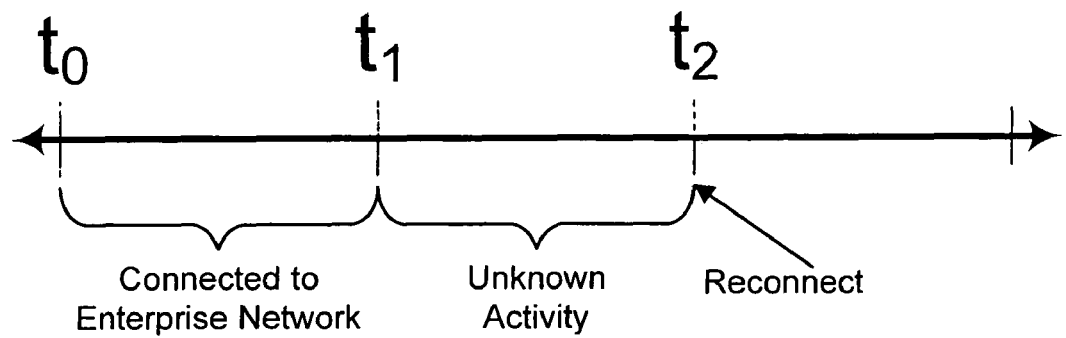
FIG. 3 is a timeline representation of a sample of a client's activity.

FIG. 3 is a timeline representation of a sample of a client's activity. At time $t_0$, client 102 connected to enterprise network 106. In this case, time $t_0$ is the beginning of a workday. At time $t_1$, the employee disconnected client 102 from enterprise network 106. Here, the interval between times $t_0$ and $t_1$ represents the employee's work day. During this interval, client 102 performed assorted tasks and was protected by the security afforded by system 100.

At time $t_2$, client 102 reconnected to enterprise network 106, for example, after returning from a weekend. In this case, the interval between times $t_1$ and $t_2$ represents the time the employee spent away from work. During this interval, client 102 was disconnected from enterprise network 106, and as such, client 102 did not receive the security benefits offered by enterprise network 106.

It is possible that client 102 remained powered off during the interval. As described in more detail below, it is also possible that client 102 engaged in a significant number of risky activities. If client 102 were to keep a log of its activities while disconnected from enterprise network 106, that information could be presented when attempting to reconnect to enterprise network 106 and could be used to help make a more informed decision about the threat posed by client 102.

FIG. 4 illustrates an example of an activity log. In this example, client 102 maintains an activity log, such as activity log 400, in which various actions client 102 has been used to perform and/or actions that have been performed to and/or with respect to client 102, during a period of roaming are recorded. Hereinafter, particular entries in the log are notated as 400.xx, in which "xx" represents the number of the entry as shown in FIG. 4. For example, the first entry in activity log 400 is 400.01, which notes that client 102 has disconnected to CorpNet, an enterprise network. In this case, an employee had previously brought a company laptop (client 102) into work. The remainder of activity log 400 details actions taken by the employee while embarking on a business trip and subsequently returning to the office.

The employee powered off the laptop (400.02). The employee then traveled to the airport, using a wireless access point at the airport to check email (400.04). After a flight, the employee checked into FirstHotel and used the hotel's wireless access point to check mail again, this time downloading an attached executable program (400.08).

The next morning, the employee visited a coffee shop, making use of the CoffeeHaus wireless access point (400.11) and began browsing the World Wide Web (400.12). One of the sites visited was malicious, causing the surreptitious download and install of a known spyware program, "FreeBieWare.exe" (400.13). The employee then departed CoffeeHaus, disconnecting from the access point (400.14).

The employee subsequently visited a customer to demonstrate features in a product. The employee created a new user (400.15) and installed the demonstration program (400.16), making use of the customer's wireless internet access to check email once again (400.18). While visiting with the customer, the employee left the laptop unattended. During that time, a nefarious person changed the permissions on an account (400.19) and added a backdoor to the system by editing the registry (400.20) and removing a local security application (400.21).

Eventually, the employee returned from the trip and attempted to connect to enterprise network 106 (400.52). As described in more detail below, as part of the connection process, client 102 sent a copy of activity list 400 to NAC 108 (400.53).

Figure 5:
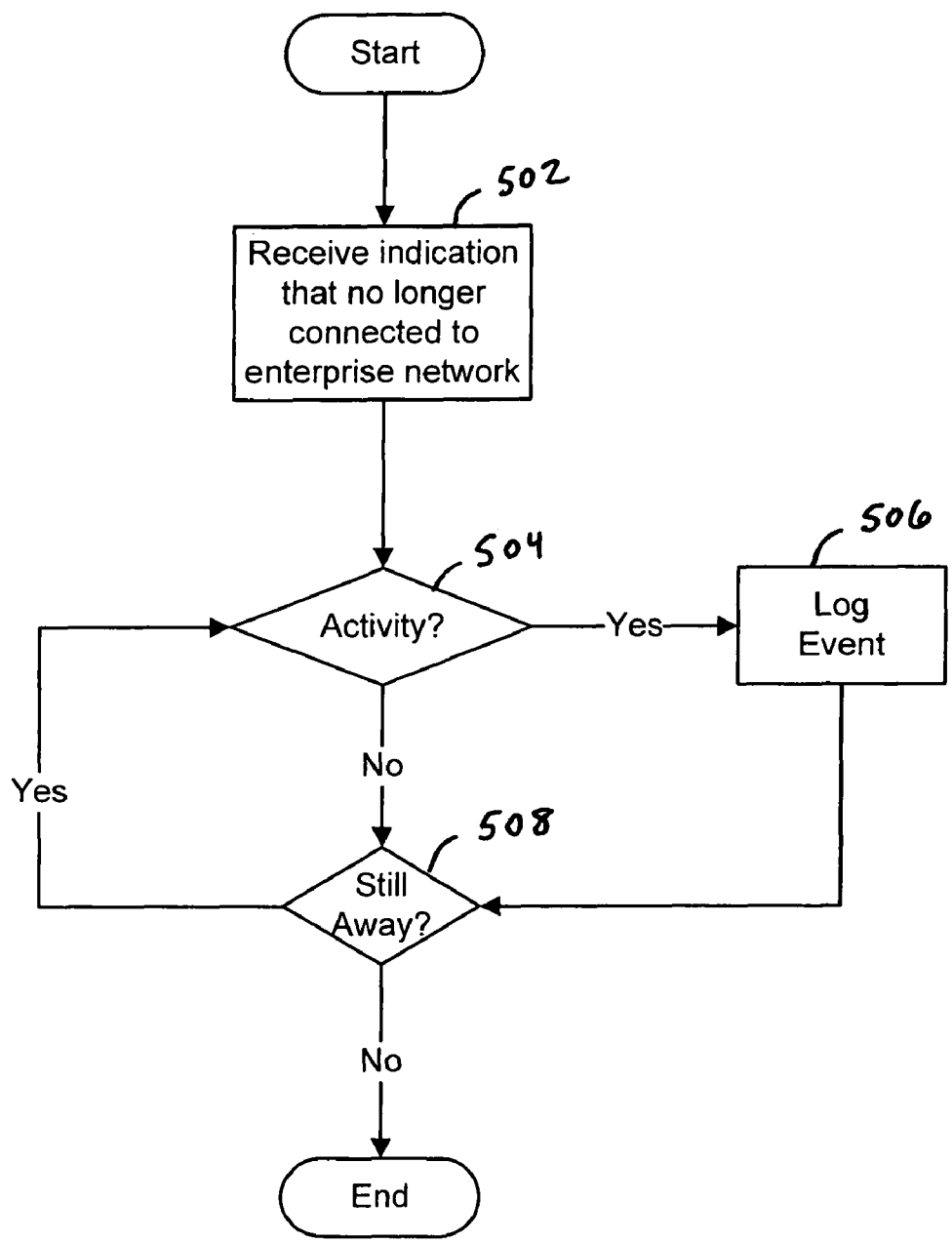
FIG. 5 is a flow chart illustrating an embodiment of a process for creating entries in an activity log.

FIG. 5 is a flow chart illustrating an embodiment of a process for creating entries in an activity log. In the example shown, the process is implemented on client 102 and is used to create activity log 400. The process begins at 502, when it is determined that client 102 is no longer connected to enterprise network 106. In this case, the determination is made by an agent residing on client 102. Agent-less models, such as an RPC implementation, could also be used, as appropriate.

While client 102 is disconnected from enterprise network 106, client 102 is monitored for the occurrence of certain activities (504). Examples of "activities" include network events, such as joining and leaving a network (e.g., 400.03, 400.14), use of assorted protocols (e.g., 400.04, 400.08), and visiting particular sites (e.g., 400.12). Other examples of activities include events such as the creation or deletion of user accounts (e.g., 400.15), the installation or deletion of applications (e.g., 400.13, 400.21), processes created or modified, system settings altered (such as services stopped or changed to manual from automatic), and so on.

Further examples of activities include events such as different users logging in and out of the same client, and using non-standard software (e.g., happywebbrowser.exe instead of firefox.exe or ie.exe) to perform standard tasks. Activities can also include events such as application crashes and system crashes, which can indicate exploits.

When an activity occurs, information about the activity is logged at 506. The amount of information logged about the activity may vary, for example, based on the type of activity, or on another criterion, such as the setting of a log level by an administrator. In various embodiments, the type of activities that are logged is preconfigured and/or configurable by an administrator, e.g., by selecting (e.g., via a user interface) a level of security that corresponds to a preconfigured set of activities to be logged or by selecting from a menu or list specific activities to be logged.

Information may also be aggregated or transformed. As shown at 400.12, for example, rather than logging the actual URLs visited while browsing, the number of sites may be logged, or hashes of the URLs may be computed for comparison against hashes of the URLs of known malicious websites. This sort of logging may be used where collecting a more complete set of information may be cumbersome, or may have privacy or other policy implications.

In this example, when it is determined that client 102 has rejoined enterprise network 106 (508), the logging process ends. In other cases, client 102 may track all relevant activities, whether disconnected from enterprise network 106 or not, or may track activities over an arbitrary interval.

Figure 6:
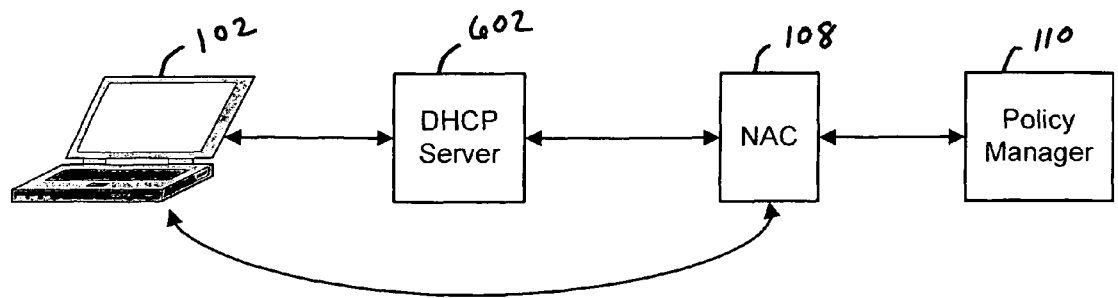
FIG. 6 is a diagram illustrating an embodiment of a client attempting to connect to an enterprise network.

FIG. 6 is a diagram illustrating an embodiment of a client attempting to connect to an enterprise network. In the example shown, client 102 connects to DHCP server 602, requesting an IP address. DHCP server 602 contacts NAC 108. In this embodiment, NAC 108 performs typical evaluations, such as checking the patch level of client 102, and also requests client 102's activity log. NAC 108 sends the activity log to policy manager 110. As explained in more detail below, policy manager 110 processes the activity log, such as by comparing the events listed in the activity log against policies specified by an administrator, or by using scores such as a weighted heuristic.

In some embodiments, the policy manager uses the activity log, in addition to authentication and configuration information, such as patch level, to make admission decisions. In this embodiment, DHCP server 602 is notified whether to assign an IP address, and if so, whether to grant full access to the enterprise, or to a limited view of the network. In some embodiments, a virtual LAN is used to provide limited access to a protected network in the event the policy manager determines, e.g., based on the activity log, that a client presents some degree of risk but not such a great risk that admission should be denied entirely.

Figure 7:
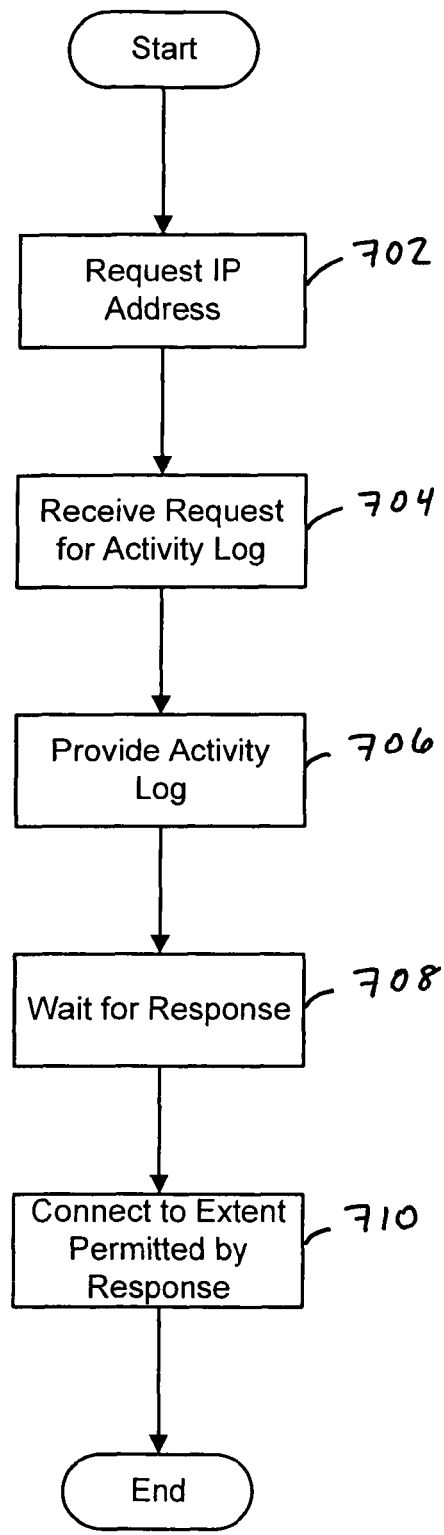
FIG. 7 is a flow chart illustrating an embodiment of a process for connecting to a network having admission control.

FIG. 7 is a flow chart illustrating an embodiment of a process for connecting to a network having admission control. In the example shown, the process is implemented on client 102. The process begins at 702 when client 102 requests an IP address, for example by contacting DHCP server 602. In this example, at 704, client 102's activity log is requested at 704, such as by NAC 108. At 706, client 102 transmits its activity log to NAC 108. In some embodiments, client 102 provides the activity log at the time it requests an IP address, without prompting from NAC 108. In that case, portions 702-706 of the process shown in FIG. 7 may be combined or eliminated, as appropriate.

Client 102 waits at 708, while NAC 108 and policy manager 110 process the activity log and make an admission determination. As explained in more detail below, at 710, client 102 may be permitted to connect to enterprise network 106 in a variety of ways. If it is determined to pose no or little threat, client 102 may be granted a typical IP address and permitted full access to enterprise network 106. If it is determined to pose a significant threat, client 102 may be denied an IP address and forbidden from accessing any part of enterprise network 106. In other cases, client 102 may be granted limited access and/or required to undergo remediation before being granted access to enterprise network 106.

Figure 8:
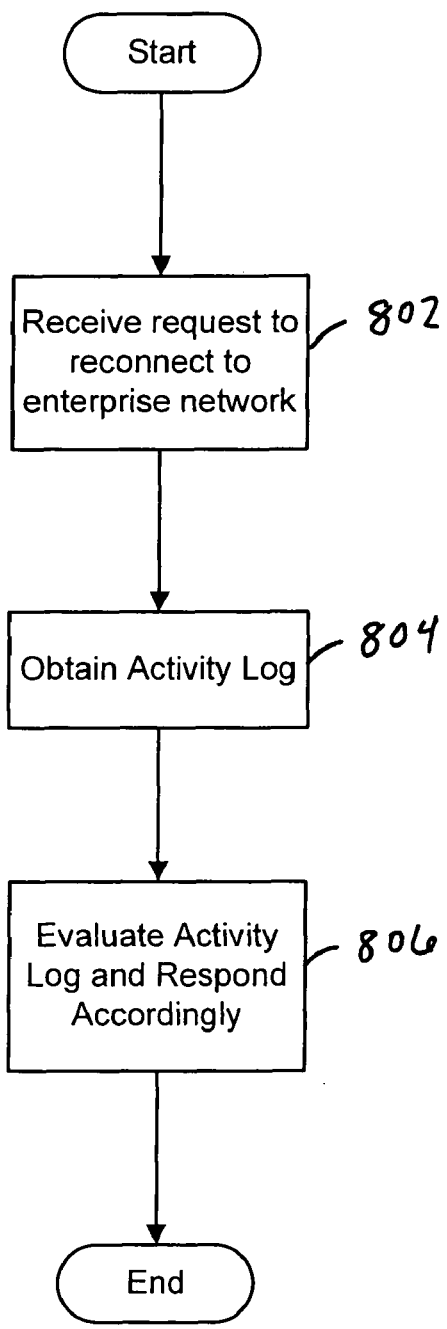
FIG. 8 is a flow chart illustrating an embodiment of a process for responding to a connection request.

FIG. 8 is a flow chart illustrating an embodiment of a process for responding to a connection request. In the example shown, the process is implemented by NAC 108 and policy manager 110. The process begins at 802 when a request to allow client 102 to reconnect to enterprise network 106 is received. At 804, an activity log is obtained from client 102. As described in greater detail below, at 806, the activity log is evaluated and client 102 is either denied access, or provided a level of access as appropriate.

Figure 9:
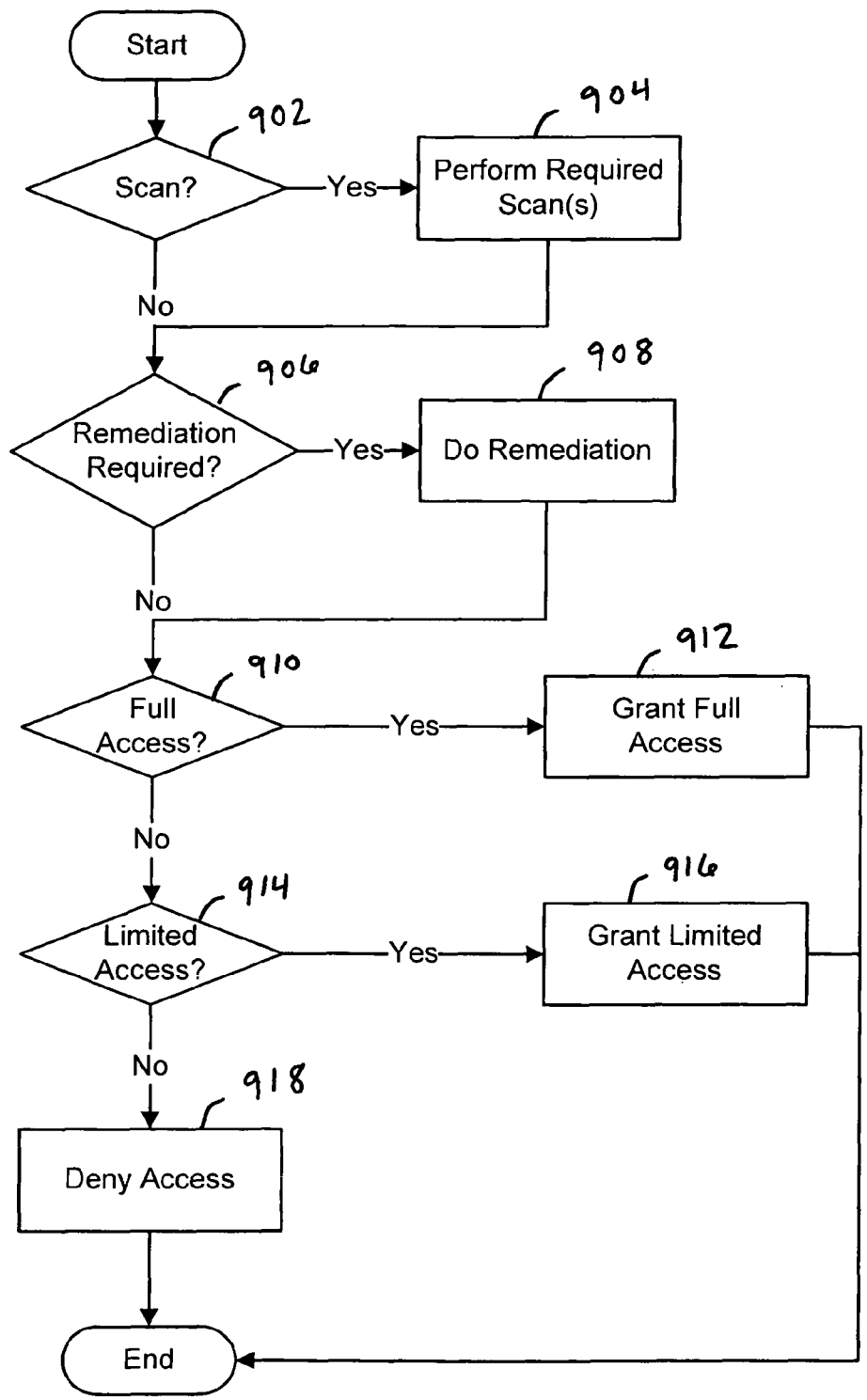
FIG. 9 is a flow chart illustrating an embodiment of a process for determining what level of access should be granted to a client.

FIG. 9 is a flow chart illustrating an embodiment of a process for determining what level of access should be granted to a client. This process is used in some embodiments to implement 806 of the process depicted in FIG. 8.

The process begins at 902 when it is determined whether client 102 requires any scans. For example, if the activity log reveals that client 102 was powered off for the duration of the time it was away from enterprise network 106, in various embodiments it is determined at 902 that no scan is necessary or that only a rudimentary scan be performed. Conversely, if client 102 visited several known malicious websites, installed several new programs, and so on, intensive anti-virus and other security scans may be performed at 904. In some embodiments, the criteria for when a scan is required and the nature and extent of the scan performed is configurable, e.g., by an administrator via a user interface or by providing a policy or configuration file.

At 906, it is determined whether any remediation of client 102 is required. For example, if the virus definitions on client 102 are out of date, appropriate patches will be applied to client 102 at 908. Similarly, the company may have a rule prohibiting the installation of certain pieces of software on clients. For example, file trading software may be forbidden. If the activity log shows that file trading software was installed, the appropriate remediation may be the uninstallation of that software.

In various embodiments, varying levels of access to enterprise network 106 are granted to client 102 based at least in part on the activities appearing in client 102's activity log. For example, if it is determined (910) that client 102 has been powered off the entire time that it has been disconnected from enterprise network 106, if it has only been used to connect to the corporate VPN, or if it has otherwise only engaged in benign or reasonably low risk activities, it may be granted full access to the network at 912.

In some embodiments, the contents of submitted activity logs are tracked. Certain repeated activities may be noticed by policy manager 110 or expressly white-listed by an administrator as posing low or no risk. For example, if a company has multiple offices, the connection to or disconnection from any of the enterprise or other networks at those locations may be deemed to be safe. Similarly, if an employee takes client 102 home every night, always connects to the same DSL line, and has never returned to the enterprise network in a state requiring remediation, that may pose a significantly different threat from an employee who continually travels to conferences and trade shows, connecting to twenty different access points during a given trip.

In some cases, it may be determined (914) that limited access should be granted to client 102 (916). Suppose that client 102 has not engaged in any network activity since being disconnected from enterprise network 106, but has had several pieces of software installed or uninstalled. In that case, it may be appropriate to allow client 102 access to resources such as email, while preventing access to other clients on the network, for example until such time as an administrator has had an opportunity to remove unauthorized software or reinstall required software. Other examples of providing limited access include providing access to the Internet only, and not to internal servers; providing access to servers but not to other clients; and other configurations, such as ones making use of one or more virtual LANs. In some embodiments, the criteria for granting limited access and the scope/nature to be granted are configurable.

In some cases, such as at 918, it is determined that no access should be granted. For example, in the example shown in FIG. 4, activity log 400 reflects several indicators that client 102 poses a very serious security risk to enterprise network 106. Among other things, it has accessed 23 new websites (400.12), including one from which known spyware was downloaded and installed (400.13). It has also had critical software removed (400.21) and a new user has been created with administrator privileges (400.19). In this scenario, in addition to denying access to enterprise network 106, policy manager 110 may also create a trouble ticket or otherwise notify an administrator that client 102 should be carefully examined by hand.

In some embodiments policy manager 110 uses details from the activity log to generate rules for other machines in the enterprise. For example, in some embodiments the rules reflect the risk level that policy manager 110 determines client 102 will bring to the enterprise network. If client 102 visited sites that are known to host malware, associated with several insecure networks, or if user privileges have been increased, the risk level may be set high. If client 102 was powered down the entire time it was away from the enterprise, it may pose no risk at all. Rules may also be based on whether client 102's owner role information is available.

In various embodiments, policy manager 110 provides or can be configured to provide rules to (or function as) a central security management system that uses the information to modify other network controls, such as firewalls, or send notifications to other hosts in the network, such as "don't accept connections from client 102 for 12 hours." This may be helpful, for example, in preventing attacks in which an adversary has rigged an exploit to a timer, such as having the client wait 1 hour after rejoining the network, and then propagate a worm.

Depending on the risk level, only a limited set of protocols may be allowed to be used by or with client 102, or client 102 may not be allowed to connect to other clients for a period of time. The rules may also vary from node to node. For example, servers may be instructed to offer limited services to client 102, while other clients may be forbidden from communicating with client 102 at all.

In some embodiments, other application infrastructure such as a domain controller is used in at least certain circumstances to grant limited access (916). For example, in some embodiments when a user attempts to log on the level of risk the user and/or the user's client system pose to the protected network is evaluated and the user's privileges—e.g., which network-based applications and services the user is allowed to access and the user's rights with respect to those applications/service the user is allowed to access—are adjusted relative to risk level.

Figure 10:
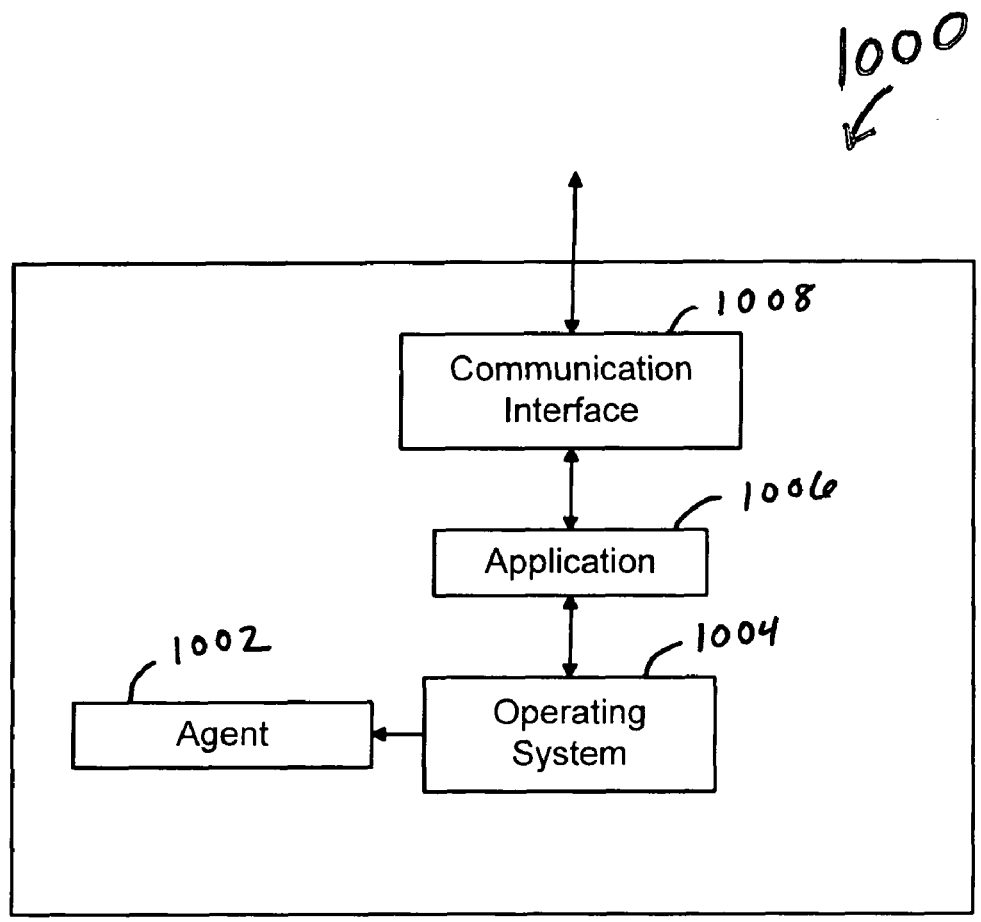
FIG. 10 is a block diagram illustrating an embodiment of a device implementing activity logging.

FIG. 10 is a block diagram illustrating an embodiment of a device implementing activity logging. Security agent 1002, working in conjunction with operating system 1004, collects and records information about assorted activities performed by device 1000 in an activity log. In some embodiments, security agent 1002 collects information while device 1000 is removed from an enterprise network. In some embodiments, security agent 1002 collects information constantly, or during an arbitrary interval.

Device 1000 includes a communication interface (e.g., a network interface card or other interface) 1008 configured to connect to and disconnect from one or more enterprise networks. When device 1000 attempts to connect to an enterprise network, such as enterprise network 106, the activity log is transmitted as appropriate. In this example, application 1006 is a user-level application responsible for coordinating the transmission of the application log. In other cases, application 1006 is a system-level application or is combined with agent 1002 into a single component.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for accessing a protected network comprising:
logging one or more events into an event log in electronic storage, wherein the one or more events occur while a network capable device is disconnected from the protected network, wherein an amount of information logged about an event is based at least in part on a type of the event and wherein the type of events logged is configurable;
aggregating a log of a quantity of websites visited;
computing, using at least one computer processor, hashes of visited URLs and comparing the computed hashes of visited URLs against hashes of URLs of predetermined malicious websites; and
providing at least one of the event log and the comparison against hashes of URLs of predetermined malicious websites to one or more other devices associated with the protected network in connection with a request for the network capable device to access the protected network.

2. The method of claim 1 further including monitoring activity while disconnected from the protected network.

3. The method of claim 2 wherein said monitoring includes monitoring for one or more of software installation, software removal, registry modification, website visited, access points connected to, other networks connected to, user added, and user deleted.

4. The method of claim 1 wherein said events include one or more of software installation, software removal, registry modification, website visited, access points connected to, other networks connected to, user added, and user deleted.

5. The method of claim 1 wherein the log is provided to a network admission control server.

6. The method of claim 1 wherein the log is provided to a policy manager.

7. The method of claim 1 further including receiving an indication of one or more types of event to be logged.

8. The method of claim 1 further including receiving limited access to the protected network and enforcing an associated limitation.

9. A method for controlling access to a protected network comprising: receiving from a network client device requesting access to the protected network an electronic activity log of activities of the network client device during a period in which the network client device was not connected to the protected network, wherein an amount of information about an activity in the activity log is based at least in part on a type of the activity and wherein the type of activities logged is configurable;
receiving an aggregated log of a quantity of websites visited;
receiving a computation of hashes of visited URLs;
comparing the computed hashes of visited URLs against hashes of URLs of predetermined malicious websites; and
determining based at least in part on the activity log and the comparison against hashes of URLs of predetermined websites what access to grant the network client device.

10. The method of claim 9 wherein determining what access to grant the network client device includes determining to deny access to the network client device if the log indicates the network client device poses a risk to the protected network.

11. The method of claim 9 wherein determining what access to grant the network client device includes granting the network client device limited access to the protected network if the log indicates the network client device poses a limited risk to the protected network.

12. The method of claim 9 wherein determining what access to grant the network client device includes granting the network client device unlimited access to the protected network based at least in part on a determination that the log indicates the network client device poses no significant risk to the protected network.

13. The method of claim 9 further comprising updating policies on one or more nodes on the network based at least in part on the activity log.

14. A system for accessing a protected network comprising:
> a processor configured to
>> log one or more events that occur while a network capable device is disconnected from the protected network into an event log, wherein an amount of information logged about an event is based at least in part on a type of the event and wherein the type of events logged is configurable;
>> aggregate a log of a quantity of websites visited;
>> compute hashes of visited URLs and compare the computed hashes of visited URLs against hashes of URLs of predetermined malicious websites; and
>
> a communication interface configured to provide the event log and the comparison against hashes of URLs of predetermined malicious websites to one or more other devices associated with the protected network in connection with a request for the network capable device to access the protected network.

15. The system of claim 14, wherein the processor is further configured to monitor activity while disconnected from the protected network.

16. The system of claim 15 wherein said monitoring includes monitoring for one or more of software installation, software removal, registry modification, website visited, access points connected to, other networks connected to, user added, and user deleted.

17. The system of claim 14 wherein said events include one or more of software installation, software removal, registry modification, website visited, access points connected to, other networks connected to, user added, and user deleted.

18. The system of claim 14 wherein the communication interface is configured to provide the log to a network admission control server.

19. The system of claim 14 wherein the communication interface is configured to provide the log to a policy manager.

20. A system for controlling access to a protected network comprising:
> a communication interface configured to receive from a client requesting access to the protected network a log of activities of the client during a period in which the client was not connected to the protected network, wherein an amount of information about an activity in the activity log is based at least in part on a type of the activity and wherein the type of activities logged is configurable;
> a processor configured to:
>> aggregate a log of a quantity of websites visited;
>> compute hashes of visited URLs and compare the computed hashes of visited URLs against hashes of URLs of predetermined malicious websites; and
>> determine based at least in part on the activity log and the comparison against hashes of URLs of predetermined malicious websites what access to grant the client.

21. The system of claim 20 wherein determining what access to grant the client includes determining to deny access to the client if the log indicates the client poses a risk to the protected network.

22. The system of claim 20 wherein determining what access to grant the client includes granting the client limited access to the protected network if the log indicates the client poses a limited risk to the protected network.

23. The system of claim 20 wherein determining what access to grant the client includes granting the client unlimited access to the protected network based at least in part on a determination that the log indicates the client poses no significant risk to the protected network.

24. The system of claim 20 wherein the processor is further configured to update policies on one or more nodes on the network based at least in part on the activity log.

25. A computer program product for accessing a protected network, the computer program product being embodied in a non-transitory computer readable storage medium and comprising computer instructions for:
> logging one or more events that occur while a network capable device is disconnected from the protected network into an event log, wherein an amount of information logged about an event is based at least in part on a type of the event and wherein the type of events logged is configurable;
> aggregating a log of a quantity of websites visited;
> computing hashes of visited URLs and comparing the computed hashes of visited URLs against hashes of URLs of predetermined malicious websites; and
> providing the event log and the comparison against hashes of URLs of predetermined malicious websites to one or more other devices associated with the protected network in connection with a request for the network capable device to access the protected network.

26. The computer program product as recited in claim 25, the computer program product further comprising computer instructions for monitoring activity while disconnected from the protected network.

27. The computer program product as recited in claim 26 wherein said monitoring includes monitoring for one or more of software installation, software removal, registry modification, website visited, access points connected to, other networks connected to, user added, and user deleted.

28. The computer program product as recited in claim 25 wherein said events include one or more of software installation, software removal, registry modification, website visited, access points connected to, other networks connected to, user added, and user deleted.

29. The computer program product as recited in claim 25 wherein the log is provided to a network admission control server.

30. The computer program product as recited in claim 25 wherein the log is provided to a policy manager.

31. The computer program product as recited in claim 25, the computer program product further comprising computer instructions for receiving an indication of one or more types of event to be logged.

32. The computer program product as recited in claim 25, the computer program product further comprising computer instructions for receiving limited access to the protected network and enforcing an associated limitation.

33. A computer program product for controlling access to a protected network, the computer program product being embodied in a non-transitory computer readable storage medium and comprising computer instructions for:
> receiving from a client requesting access to the protected network a log of activities of the client during a period in which the client was not connected to the protected network, wherein an amount of information about an activity in the activity log is based at least in part on a type of the activity and wherein the type of activities logged is configurable;
> aggregating a log of a quantity of websites visited;
> computing hashes of visited URLs and comparing the computed hashes of visited URLs against hashes of URLs of predetermined malicious websites; and
> determining based at least in part on the activity log and the comparison against hashes of URLs of predetermined malicious websites what access to grant the client.

34. The computer program product as recited in claim 33 wherein determining what access to grant the client includes determining to deny access to the client if the log indicates the client poses a risk to the protected network.

35. The computer program product as recited in claim 33 wherein determining what access to grant the client includes granting the client limited access to the protected network if the log indicates the client poses a limited risk to the protected network.

36. The computer program product as recited in claim 33 wherein determining what access to grant the client includes granting the client unlimited access to the protected network based at least in part on a determination that the log indicates the client poses no significant risk to the protected network.

37. The computer program product as recited in claim 33, the computer program product further comprising computer instructions for updating policies on one or more nodes on the network based at least in part on the activity log.

\* \* \* \* \*